(12) United States Patent
Nakanishi et al.

(10) Patent No.: US 9,142,858 B2
(45) Date of Patent: Sep. 22, 2015

(54) NON-AQUEOUS ELECTROLYTE SECONDARY BATTERY, NEGATIVE ELECTRODE, NEGATIVE ELECTRODE MATERIAL, AND PREPARATION OF SI—O—AL COMPOSITE

(75) Inventors: Tetsuo Nakanishi, Annaka (JP); Koichiro Watanabe, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 939 days.

(21) Appl. No.: 12/546,788

(22) Filed: Aug. 25, 2009

(65) Prior Publication Data

US 2010/0055563 A1    Mar. 4, 2010

(30) Foreign Application Priority Data

Aug. 26, 2008 (JP) .................. 2008-216368

(51) Int. Cl.
*H01M 4/131* (2010.01)
*H01M 4/34* (2006.01)
*H01M 4/36* (2006.01)
(Continued)

(52) U.S. Cl.
CPC .......... *H01M 10/0525* (2013.01); *H01M 4/134* (2013.01); *H01M 4/364* (2013.01); *H01M 4/38* (2013.01); *H01M 4/386* (2013.01); *H01M 4/485* (2013.01); *H01M 4/622* (2013.01); *C01P 2002/70* (2013.01); *C01P 2002/72* (2013.01); *C01P 2002/74* (2013.01); *C01P 2006/12* (2013.01); *C01P 2006/40* (2013.01);
(Continued)

(58) Field of Classification Search
CPC ..... H01M 4/131; H01M 4/134; H01M 4/364; H01M 4/485; H01M 4/386; H01M 4/38; H01M 10/0525; H01M 4/62; H01M 2004/021; C01P 2002/70; C01P 2002/72; C01P 2002/74; C01P 2002/742; C01P 2006/12; C01P 2006/40
USPC .............. 429/218.1; 423/327.1, 327.2, 328.1, 423/328.2, 329.1; 252/518.1, 521.3
See application file for complete search history.

(56) References Cited

U.S. PATENT DOCUMENTS 5,401,599 A    3/1995   Tahara et al.
5,478,671 A    12/1995  Idota
(Continued)

FOREIGN PATENT DOCUMENTS

EP    0 143 302 A2    6/1985
JP    11-86847 A      3/1999
(Continued)

OTHER PUBLICATIONS

English-Language Translation of Office Action issued Dec. 8, 2010, in corresponding Japanese Patent Application No. 2008-216368.

*Primary Examiner* — Eugenia Wang
(74) *Attorney, Agent, or Firm* — Birch, Stewart, Kolasch & Birch, LLP

(57) ABSTRACT

A Si—O—Al composite comprising silicon, silicon oxide, and aluminum oxide exhibits a powder XRD spectrum in which the intensity of a signal of silicon at 28.3° is 1-9 times the intensity of a signal near 21°. A negative electrode material comprising the Si—O—Al composite is used to construct a non-aqueous electrolyte secondary battery which is improved in 1st cycle charge/discharge efficiency and cycle performance while maintaining the high battery capacity and low volume expansion upon charging of silicon oxide.

14 Claims, 1 Drawing Sheet

(51) Int. Cl.
*H01M 4/485* (2010.01)
*H01M 4/38* (2006.01)
*H01M 4/62* (2006.01)
*H01M 10/0525* (2010.01)
*H01M 4/134* (2010.01)
*H01M 4/02* (2006.01)

(52) U.S. Cl.
CPC ......... *H01M4/131* (2013.01); *H01M 2004/021* (2013.01); *Y02E 60/122* (2013.01)

(56) References Cited

U.S. PATENT DOCUMENTS

| | | | |
|---|---|---|---|
| 6,066,414 | A | 5/2000 | Imoto et al. |
| 6,383,686 | B1 | 5/2002 | Umeno et al. |
| 6,413,672 | B1 | 7/2002 | Suzuki et al. |
| 6,638,662 | B2 | 10/2003 | Kaneda et al. |
| 2003/0215711 | A1* | 11/2003 | Aramata et al. ............ 429/218.1 |
| 2004/0091419 | A1* | 5/2004 | Ogihara et al. ................ 423/702 |
| 2004/0149961 | A1* | 8/2004 | Konuma et al. ................ 252/500 |
| 2005/0241137 | A1* | 11/2005 | Suzuki et al. ................. 29/592.1 |
| 2006/0140835 | A1* | 6/2006 | Zones et al. ................. 423/239.2 |
| 2006/0275662 | A1 | 12/2006 | Hirose et al. |
| 2007/0054190 | A1* | 3/2007 | Fukui et al. ................ 429/218.1 |
| 2007/0099081 | A1 | 5/2007 | Matsuda et al. |
| 2007/0254102 | A1 | 11/2007 | Fukuoka et al. |
| 2008/0124631 | A1* | 5/2008 | Fukui et al. ..................... 429/217 |
| 2009/0075173 | A1 | 3/2009 | Jeong et al. |

FOREIGN PATENT DOCUMENTS

| | | |
|---|---|---|
| JP | 2964732 B2 | 10/1999 |
| JP | 2997741 B2 | 1/2000 |
| JP | 3008228 B2 | 2/2000 |
| JP | 2000-173596 A | 6/2000 |
| JP | 2000-215887 A | 8/2000 |
| JP | 3079343 B2 | 8/2000 |
| JP | 2000-243396 A | 9/2000 |
| JP | 3242751 B2 | 12/2001 |
| JP | 2002-42806 A | 2/2002 |
| JP | 2002-75351 A | 3/2002 |
| JP | 3291260 B2 | 6/2002 |
| JP | 2003-109590 A | 4/2003 |
| JP | 2004-185991 A | 7/2004 |
| JP | 2004-303593 A | 10/2004 |
| JP | 3622629 B2 | 2/2005 |
| JP | 3622631 B2 | 2/2005 |
| JP | 2005-190902 A | 7/2005 |
| JP | 2005-235589 A | 9/2005 |
| JP | 2005-317309 A | 11/2005 |
| JP | 2006-216374 A | 8/2006 |
| JP | 2006-236684 A | 9/2006 |
| JP | 3846661 B2 | 11/2006 |
| JP | 2006-338996 A | 12/2006 |
| JP | 2006-339092 A | 12/2006 |
| JP | 2007-122992 A | 5/2007 |
| JP | 3918311 B2 | 5/2007 |
| JP | 3982230 B2 | 9/2007 |
| JP | 2007-290919 A | 11/2007 |
| JP | 2009-70825 A | 4/2009 |

* cited by examiner

NON-AQUEOUS ELECTROLYTE SECONDARY BATTERY, NEGATIVE ELECTRODE, NEGATIVE ELECTRODE MATERIAL, AND PREPARATION OF SI—O—AL COMPOSITE

CROSS-REFERENCE TO RELATED APPLICATION

This non-provisional application claims priority under 35 U.S.C. §119(a) on Patent Application No. 2008-216368 filed in Japan on Aug. 26, 2008, the entire contents of which are hereby incorporated by reference.

TECHNICAL FIELD

This invention generally relates to non-aqueous electrolyte secondary batteries, typically lithium ion secondary batteries. Specifically, it relates to a negative electrode material comprising an Si—O—Al composite as an active material for use in such batteries, a method for the preparation of Si—O—Al composite, a negative electrode made thereof, and a non-aqueous electrolyte secondary battery.

BACKGROUND ART

In conjunction with the recent rapid advances of portable electronic equipment and communications instruments, non-aqueous electrolyte secondary batteries having a high energy density are strongly demanded from the aspects of cost, size and weight reductions. A number of measures are known in the art for increasing the capacity of such non-aqueous electrolyte secondary batteries. For example, JP 3008228 and JP 3242751 disclose negative electrode materials comprising oxides of B, Ti, V, Mn, Co, Fe, Ni, Cr, Nb, and Mo and composite oxides thereof. A negative electrode material comprising $M_{100-x}Si_x$ wherein x≥50 at % and M=Ni, Fe, Co or Mn is obtained by quenching from the melt (JP 3846661). Other negative electrode materials are known as comprising silicon oxide (JP 2997741), and $Si_2N_2O$, $Ge_2N_2O$ or $Sn_2N_2O$ (JP 3918311).

Silicon is regarded most promising in attaining the battery's goals of size reduction and capacity enhancement since it exhibits an extraordinarily high theoretical capacity of 4,200 mAh/g as compared with the theoretical capacity 372 mAh/g of carbonaceous materials that are currently used in commercial batteries. Silicon is known to take various forms of different crystalline structure depending on a preparation process. For example, JP 2964732 discloses a lithium ion secondary battery using single crystal silicon as a support for negative electrode active material. JP 3079343 discloses a lithium ion secondary battery using a lithium alloy $Li_xSi$ (0≤x≤5) with single crystal silicon, polycrystalline silicon or amorphous silicon. Of these, the lithium alloy $Li_xSi$ with amorphous silicon is preferred, which is prepared by coating crystalline silicon with amorphous silicon resulting from plasma decomposition of monosilane, followed by grinding. However, the negative electrode material therein uses 30 parts of a silicon component and 55 parts of graphite as the conductive agent as described in Example, failing to take full advantage of the potential battery capacity of silicon.

For the purpose of imparting conductivity to negative electrode materials, JP-A 2000-243396 teaches mechanical alloying of a metal oxide such as silicon oxide with graphite and subsequent carbonization; JP-A 2000-215887 mentions coating of Si particles on their surface with a carbon layer by chemical vapor deposition; and JP-A 2002-42806 proposes coating of silicon oxide particles on their surface with a carbon layer by chemical vapor deposition. The provision of particle surfaces with a carbon layer improves conductivity, but is not successful in overcoming the outstanding problems of silicon negative electrodes, i.e., in mitigating substantial volumetric changes associated with charge/discharge cycles or in preventing electricity collection and cycle performance from degrading.

Recently different approaches are thus taken, for example, a method for restraining volume expansion by restricting the percent utilization of silicon battery capacity (JP-A 2000-215887, JP-A 2000-173596, JP 3291260, JP-A 2005-317309), a method of quenching a melt of silicon having alumina added thereto for utilizing grain boundaries in polycrystalline particles as the buffer to volumetric changes (JP-A 2003-109590), polycrystalline particles of mixed phase polycrystals of α- and β-FeSi$_2$ (JP-A 2004-185991), and hot plastic working of a monocrystalline silicon ingot (JP-A 2004-303593).

Means for mitigating volume expansion by tailoring the layer structure of silicon active material are also disclosed, for example, disposition of two layers of silicon negative electrode (JP-A 2005-190902), and coating or encapsulating with carbon or another metal and oxide for restraining particles from spalling off (JP-A 2005-235589, JP-A 2006-216374, JP-A 2006-236684, JP-A 2006-339092, JP 3622629, JP-A 2002-75351, and JP 3622631). In the method of gas phase growing silicon directly on a current collector, degradation of cycle performance due to volume expansion can be restrained by controlling the growth direction (JP-A 2006-338996).

The method of enhancing the cycle performance of negative electrode material by coating silicon surfaces with carbon to be electrically conductive or coating silicon with an amorphous metal layer as mentioned above utilizes only about a half of the silicon's own battery capacity. There is a desire for a higher capacity. As for the polycrystalline silicon having grain boundaries, the disclosed method is difficult to control the cooling rate and hence, to reproduce consistent physical properties.

On the other hand, silicon oxide is represented by SiOx wherein x is slightly greater than the theory of 1 due to oxide coating, and is found on transmission electron microscope analysis to have the structure that crystalline silicon ranging from several to several tens of nanometers is finely dispersed in silicon oxide. The battery capacity of silicon oxide is smaller than that of silicon, but greater than that of carbon by a factor of 5 to 6 on a weight basis. Silicon oxide experiences a relatively less volume expansion. Silicon oxide is thus believed ready for use as the negative electrode active material. Nevertheless, silicon oxide has a substantial irreversible capacity and a very low initial efficiency of about 70%, which requires an extra battery capacity of the positive electrode when a battery is actually fabricated. Then an increase of battery capacity corresponding to the 5 to 6-fold capacity increase per active material weight is not expectable.

The problem of silicon oxide to be overcome prior to practical use is a substantially low initial efficiency. This may be overcome by making up the irreversible fraction of capacity or by restraining the irreversible capacity. The method of making up the irreversible fraction of capacity by previously doping silicon oxide with Li metal is reported effective. Doping of lithium metal may be carried out by attaching a lithium foil to a surface of negative electrode active material (JP-A 11-086847) or by vapor depositing lithium on a surface of negative electrode active material (JP-A 2007-122992). As for the attachment of a lithium foil, a thin lithium foil that matches with the initial efficiency of silicon oxide negative electrode is hardly available or prohibitively expensive if available. The deposition of lithium vapor makes the fabrication process complex and is impractical.

Aside from lithium doping, it is also disclosed to enhance the initial efficiency of negative electrode by increasing a weight proportion of silicon. One method is by adding silicon particles to silicon oxide particles to reduce the weight proportion of silicon oxide (JP 3982230). In another method, silicon vapor is generated and precipitated in the same stage as is produced silicon oxide, obtaining mixed solids of silicon and silicon oxide (JP-A 2007-290919). Silicon as an active material has both a high initial efficiency and a high battery capacity as compared with silicon oxide, but displays a percent volume expansion as high as 400% upon charging. Even when silicon is added to a mixture of silicon oxide and carbonaceous material, the percent volume expansion of silicon oxide is not maintained, and eventually at least 20 wt % of carbonaceous material must be added in order to suppress the battery capacity at 1,000 mAh/g. The method of obtaining the mixed solids by simultaneously generating silicon and silicon oxide vapors suffers from the working problem that the low vapor pressure of silicon necessitates the process at a high temperature in excess of 2,000° C.

As discussed above, the silicon-based active material still has a problem to be solved prior to practical use, independent of whether it is based on a metal element or an oxide thereof. There is a desire to have a negative electrode active material which can restrain the volumetric change associated with occlusion and release of lithium, mitigate a lowering of conductivity due to atomization by fissure of particles and separation of particles from the current collector, be manufactured on a mass scale at a low cost, and comply with the application as in mobile phones where repetitive cycle performance is of high priority.

CITATION LIST

Patent Document 1: JP 3008228
Patent Document 2: JP 3242751
Patent Document 3: JP 3846661
Patent Document 4: JP 2997741
Patent Document 5: JP 3918311
Patent Document 6: JP 2964732
Patent Document 7: JP 3079343
Patent Document 8: JP-A 2000-243396
Patent Document 9: JP-A 2000-215887
Patent Document 10: JP-A 2002-42806
Patent Document 11: JP-A 2000-173596
Patent Document 12: JP 3291260
Patent Document 13: JP-A 2005-317309
Patent Document 14: JP-A 2003-109590
Patent Document 15: JP-A 2004-185991
Patent Document 16: JP-A 2004-303593
Patent Document 17: JP-A 2005-190902
Patent Document 18: JP-A 2005-235589
Patent Document 19: JP-A 2006-216374
Patent Document 20: JP-A 2006-236684
Patent Document 21: JP-A 2006-339092
Patent Document 22: JP 3622629
Patent Document 23: JP-A 2002-75351
Patent Document 24: JP 3622631
Patent Document 25: JP-A 2006-338996
Patent Document 26: JP-A 11-086847
Patent Document 27: JP-A 2007-122992
Patent Document 28: JP 3982230
Patent Document 29: JP-A 2007-290919

SUMMARY OF INVENTION

An object of the invention is to provide a negative electrode material for non-aqueous electrolyte secondary batteries comprising an active material, which exhibits a high 1st cycle charge/discharge efficiency and improved cycle performance while maintaining the high battery capacity and low volume expansion of silicon oxide. Another object is to provide a negative electrode made of this material and a non-aqueous electrolyte secondary battery using the same.

The inventors made efforts to search for a negative electrode active material which has a high battery capacity surpassing carbonaceous materials, suppresses a volume change by expansion inherent to silicon base active material, and overcomes silicon oxide's drawback of a low 1st cycle charge/discharge efficiency. As a result, the inventors have found that the problems are overcome by an Si—O—Al composite, and specifically that an Si—O—Al composite comprising silicon, oxide forms of silicon and aluminum and exhibiting a powder X-ray diffraction spectrum in which the intensity of a signal of silicon at 28.3° is 1 to 9 times the intensity of a signal near 21° has an improved 1st cycle charge/discharge efficiency. A more possibility has also been found that the battery capacity of silicon oxide is maintained by controlling the crystallinity of oxide form of aluminum.

Accordingly, the invention provides a negative electrode material, a method for the preparation of an Si—O—Al composite, a negative electrode, and a non-aqueous electrolyte secondary battery, defined below.

In one aspect, the invention provides a negative electrode material for non-aqueous electrolyte secondary batteries, comprising as an active material an Si—O—Al composite comprising silicon, oxide forms of silicon and aluminum, said Si—O—Al composite exhibiting on powder X-ray diffractometry a spectrum including a signal near 21° and a signal assigned to silicon at 28.3°, the intensity of the signal at 28.3° being 1 to 9 times the intensity of the signal near 21°.

In a preferred embodiment, the Si—O—Al composite is obtained by reacting silicon oxide with aluminum. The oxide form of aluminum is typically aluminum trioxide ($Al_2O_3$). In a preferred embodiment, the XRD spectrum of the Si—O—Al composite includes no signals assigned to corundum aluminum oxide. In a preferred embodiment, the Si—O—Al composite is a coated Si—O—Al composite whose surface is covered with a carbon coating. The negative electrode material may further comprise a binder in an amount of 1 to 20% by weight based on the negative electrode material. The binder is typically a polyimide resin.

In another aspect, the invention provides a method for preparing an Si—O—Al composite, comprising the step of heat treating a mixture of silicon oxide and aluminum in an inert gas at a temperature of 500 to 1,000° C. for causing the silicon oxide to react with aluminum, thereby forming an Si—O—Al composite comprising silicon, oxide forms of silicon and aluminum, the Si—O—Al composite exhibiting on powder X-ray diffractometry a spectrum including a signal near 21° and a signal assigned to silicon at 28.3°, the intensity of the signal at 28.3° being 1 to 9 times the intensity of the signal near 21°. In a preferred embodiment, the mixture contains silicon oxide and aluminum in a weight ratio of 99/1 to 71/29.

Also provided is a negative electrode for non-aqueous electrolyte secondary batteries, comprising the negative electrode material defined above. In a preferred embodiment, the negative electrode has volumes before and after charging, the volume after charging being up to 2 times the volume before charging.

A further embodiment is a non-aqueous electrolyte secondary battery, typically a lithium ion secondary battery, comprising the negative electrode defined above, a positive electrode, a separator, and a non-aqueous electrolyte.

ADVANTAGEOUS EFFECTS OF INVENTION

A negative electrode material comprising an Si—O—Al composite prepared by the inventive method as an active material is used to construct a non-aqueous electrolyte secondary battery which has a high 1st-cycle charge/discharge efficiency and improved cycle performance while maintaining the high battery capacity and low volume expansion upon charging of silicon oxide.

DESCRIPTION OF EMBODIMENTS

Figure 1:
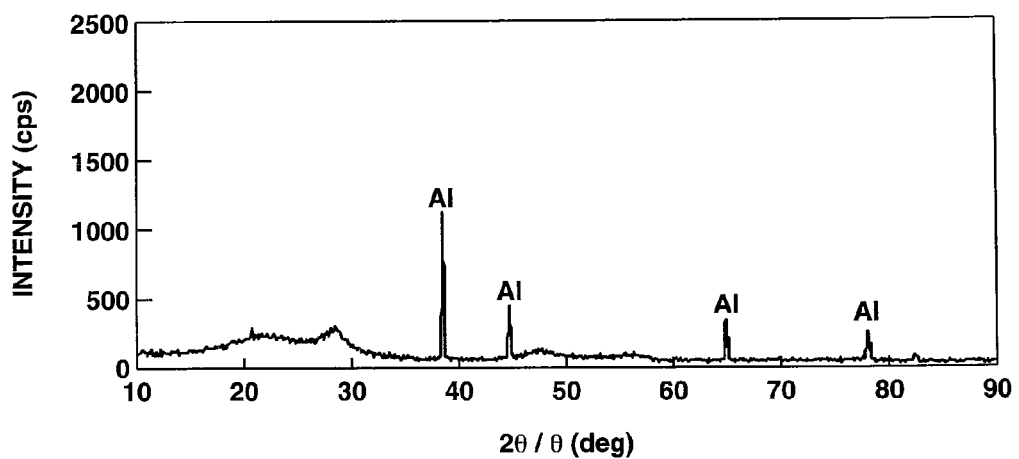
FIG. 1 is a powder XRD spectrum of a silicon oxide/aluminum powder mixture, prior to heating, used in the preparation of active material powder #2.

As used herein, the term "conductive" or "conductivity" refers to electrically conductive or electric conductivity. X-ray diffractometry is often abbreviated as XRD.

The negative electrode material for non-aqueous electrolyte secondary batteries according to the invention comprises an Si—O—Al composite as an active material and preferably a binder. The Si—O—Al composite comprises silicon, oxide forms of silicon and aluminum, and on powder X-ray diffractometry, it exhibits a spectrum including a signal near 21° and a signal assigned to silicon at 28.3°, the intensity of the signal at 28.3° being 1 to 9 times the intensity of the signal near 21°.

Si—O—Al composite

The Si—O—Al composite of the invention comprises silicon, oxide forms of silicon and aluminum, and preferably consists of silicon, oxide forms of silicon and aluminum. On powder XRD analysis, the composite exhibits a spectrum including a signal near 21° and a signal assigned to silicon at 28.3°, the intensity of the signal at 28.3° being 1 to 9 times the intensity of the signal near 21°. The Si—O—Al composite of the invention may be prepared, for example, by reaction of silicon oxide with aluminum, so that it is composed of silicon, oxide forms of silicon and aluminum. The oxide form of silicon in the composite includes partial oxides $SiO_x$ wherein $0<x<2$ and silicon dioxide $SiO_2$. The oxide form of aluminum in the composite includes aluminum trioxide or alumina $Al_2O_3$. The preferred Si—O—Al composite contains 45 to 63% by weight of silicon, 26 to 36% by weight of oxygen, and 1 to 29% by weight of aluminum.

The Si—O—Al composite of the invention is characterized by the following morphological features.

(1) On powder XRD analysis, the Si—O—Al composite exhibits a spectrum including a peak assigned to Si(111) centering near $2\theta=28.3°$ and a peak assigned to oxide form of silicon centering near $2\theta=21°$ wherein the intensity of the signal at 28.3° is 1 to 9 times the intensity of the signal near 21°, that is, $1\leq(28.3°$ signal intensity)/($21°$ signal intensity)$\leq 9$. Preferably this ratio is 1 to 5 times and more preferably 1 to 4 times. This ratio becomes an index of silicon crystallization. As long as silicon crystallization is controlled within the range, the effects of the invention may be exerted, especially the percent volume expansion on charge/discharge cycles may be kept low. The signal intensities from which the ratio is determined are measured by the powder XRD analysis described below. The intensity of the signal near 21° is a maximum in the range of 15° to 25°, and the signal of silicon at 28.3° preferably has an intensity of up to 2,000 cps.

(2) Preferably, the powder XRD spectrum of the Si—O—Al composite includes no signals assigned to corundum (symmetric) aluminum oxide. Absent the signal of corundum aluminum oxide, the composite tends to have a lower electrical resistance and a higher electrical capacity. It is noted that powder XRD analysis is performed by a powder X-ray diffractometer with a rotating anticathode (M18XHF-SRA, Mac Science Co., Ltd.), by using CuKα radiation, and $2\theta/\theta$ continuous scanning at a tube voltage of 30 kV and a tube current of 40 mA.

(3) On solid NMR ($^{29}$Si-DDMAS) analysis, the Si—O—Al composite preferably exhibits a spectrum including a broad peak assigned to silicon dioxide centering near −110 ppm and a peak characteristic of diamond crystal of silicon near −84 ppm.

These morphological features attest that the Si—O—Al composite has a structure completely different from ordinary silicon oxide ($SiO_x$: $x=1.0+\alpha$), that is, the structure itself is apparently distinct. A structure wherein silicon crystallites are dispersed in Si—O—Al composite is formed.

In a preferred embodiment, a coated Si—O—Al composite is obtained by covering surfaces of the Si—O—Al composite with a carbon coating for thereby imparting conductivity. The buildup (or coating weight) of carbon is preferably 1 to 50%, and more preferably 1 to 20% by weight based on the carbon-coated Si—O—Al composite, though not limited thereto. Too less a buildup of carbon may lead to an uneven carbon coating and an insufficient conductivity. Too large a buildup of carbon may adversely affect the battery capacity characteristic of silicon.

Typically the Si—O—Al composite is in powder form. For the management of particle size, the particle size distribution may be measured by the laser diffraction scattering method. A powder sample of particles having a total volume of 100% is analyzed to draw a cumulative curve, and the particle size at 10%, 50%, and 90% on the cumulative curve is designated 10% diameter, 50% diameter, and 90% diameter (in μm), respectively. In the invention, evaluation is made on the basis of 50% diameter which is a 50% cumulative diameter or median diameter $D_{50}$. The Si—O—Al composite powder should preferably have a median diameter $D_{50}$ of 0.1 μm to 50 μm and more preferably 1 μm to 20 μm. Outside the range, a smaller median diameter corresponds to a larger specific surface area which may lead to a lower negative electrode film density whereas particles with a larger median diameter may penetrate through a negative electrode film, causing short-circuits. As used herein, the term "average particle size" refers to the diameter as measured by the foregoing method. It is noted that the Si—O—Al composite powder should preferably have a specific surface area of at least 0.1 $m^2/g$, and more preferably at least 0.2 $m^2/g$, as measured by the BET method. Since an increase of BET surface area undesirably requires to increase the amount of a binder, the upper limit of the surface area is preferably up to 30 $m^2/g$ and more preferably up to 20 $m^2/g$.

The Si—O—Al composite should preferably be present in the negative electrode material in an amount of 5 to 95%, more preferably 20 to 95%, and even more preferably 50 to 95% by weight.

Preparation of Si—O—Al Composite

The Si—O—Al composite may be prepared by reaction of silicon oxide with aluminum. As used herein, the "silicon oxide" refers to an amorphous oxide form of silicon obtained by heating a mixture of silicon dioxide and silicon to produce a silicon oxide gas, and cooling the gas for precipitation. Specifically, the silicon oxide gas is produced at a temperature of 1,100 to 1,500° C. under a reduced pressure and transferred to a precipitation chamber at 500 to 1,100° C. where it is solidified and collected. The "silicon oxide" is represented by the general formula SiOx wherein x is in the range: $1.0 \leq x < 1.6$, and preferably $1.0 \leq x \leq 1.2$, as determined by elemental analysis of the precipitate. The starting mixture contains silicon dioxide and silicon in a molar ratio of approximately 1:1.

Silicon oxide undergoes reducing reaction with aluminum according to the following reaction scheme (I), producing silicon and aluminum oxide.

$$SiO + 2/3 Al \rightarrow Si + 1/3 Al_2O_3 \qquad (I)$$

This reaction may be conducted by (1) heating a mixture of silicon dioxide and metallic silicon to produce a silicon oxide gas and contacting the silicon oxide gas with aluminum vapor, (2) depositing a silicon oxide vapor on an aluminum foil at elevated temperature sufficient to induce reaction, or (3) heat treating a mixture of silicon oxide and aluminum, and more specifically, heating a mixture of silicon dioxide and metallic silicon to form a silicon oxide gas, cooling and precipitating the silicon oxide gas to form a silicon oxide lump or particles, mixing the silicon oxide particles with aluminum particles, and heat treating the mixture.

Process (1) has the advantage that the growth of crystalline silicon can be suppressed by controlling the temperature of the precipitating chamber, but is inefficient in manufacturing because it is difficult to control the production rate of silicon oxide gas and the evaporation rate of aluminum. Process (2) requiring evaporation of only silicon oxide is easy to control and amenable to continuous operation. Although process (3) allows for growth of crystalline silicon as compared with the evaporation process, process (3) is a simple manufacture process because reactivity can be enhanced by grinding silicon oxide particles to increase the surface area, and powdered aluminum of varying particle size is available. In addition, little or no change of particle size occurs before and after the reaction, as opposed to the mechanical alloying of silicon oxide particles with aluminum particles, and so, the reaction product immediately after reaction is ready for use as a negative electrode material. For these reasons, process (3) is the most preferred, and either process (3) or (2) may be selected as appropriate.

With process (3), silicon oxide particles may be previously ground to a particle size optimum for the negative electrode material. An appropriate particle size is 0.1 to 50 μm, and more preferably 1 to 20 μm. Aluminum particles of equivalent size may be used. However, since a smaller particle size corresponds to a larger specific surface area with a risk of ignition, usually aluminum particles having a particle size of 10 to 100 μm are preferred.

To produce silicon oxide particles of the predetermined size, any well-known grinding machine may be used in combination with a classifier. Use may be made of, for example, a ball mill and media agitating mill in which grinding media such as balls or beads are brought in motion and the charge (to be ground) is ground by utilizing impact forces, friction forces or compression forces generated by the kinetic energy; a roller mill in which grinding is carried out by compression forces generated between rollers; a jet mill in which the charge is impinged against the liner or each other at a high speed, and grinding is carried out by impact forces generated by impingement; a hammer mill, pin mill and disc mill in which a rotor with hammers, blades or pins attached thereto is rotated and the charge is ground by impact forces generated by rotation; a colloid mill utilizing shear forces; and a wet, high pressure, counter-impingement dispersing machine "Ultimizer" (Sugino Machine Ltd.). Either wet or dry grinding may be employed. The grinding may be followed by dry, wet or sieve classification in order to gain a proper particle size distribution. The dry classification generally uses a gas stream and includes successive or simultaneous steps of dispersion, separation (segregation between fine and coarse particles), collection (separation between solid and gas), and discharge. To prevent the classification efficiency from being reduced by the impacts of interference between particles, particle shape, turbulence and velocity distribution of the gas stream, electrostatic charges, or the like, pretreatment (adjustment of water content, dispersibility, humidity or the like) is carried out prior to the classification, or the gas stream is adjusted in moisture content and oxygen concentration prior to use. An integrated type of dry grinder/classifier may also be used which can conduct grinding and classifying operations at a time to deliver an output of the desired particle size distribution.

The reaction is preferably conducted in an inert gas atmosphere. The inert gas used herein may be a gas which is inert at the treating temperature such as Ar, He or $N_2$ alone or a mixture thereof, with Ar being preferred.

The reaction temperature is preferably 500 to 1,000° C., more preferably 600 to 900° C., and even more preferably 700 to 900° C. Below 500° C., aluminum particles may be left unreacted after a relatively short time of reaction. Above 1,000° C., the reaction product tends to have an increased electrical resistance and a reduced electrical capacity. Particularly when the reaction temperature is in the range of 700 to 900° C., the resulting Si—O—Al composite displays a powder XRD spectrum where no signals of corundum aluminum oxide are observed, and the silicon oxide particles therein tend to have a lower electrical resistance and a higher electrical capacity. The reaction time varies over a range depending on the shape of the reactor and the amounts of reactants and may be selected as appropriate. Usually an appropriate reaction time is 1 to 12 hours, and more preferably 3 to 6 hours.

Silicon oxide particles and aluminum are preferably fed in a weight ratio of silicon oxide/aluminum between 99/1 and 71/29, and more preferably between 95/5 and 80/20. Within this range, the advantage of silicon oxide having a higher electrical capacity than carbon base active materials is maintained and an effect of improving 1st cycle charge/discharge efficiency is exerted. The reaction may be conducted in a fluidized bed reactor, horizontal controlled-atmosphere furnace, rotary kiln or the like. For uniformity of reaction, the fluidized bed reactor is preferred. For ease of operation, the horizontal controlled-atmosphere furnace which uses a fixed bed is preferred.

On the resulting Si—O—Al composite particles, carbon may be deposited by chemical vapor deposition (CVD) or mechanical alloying. Then Si—O—Al composite covered with a carbon coating, that is, coated Si—O—Al composite is obtained.

Coating may be carried out, for example, by the following procedure. The Si—O—Al composite is subjected to a well-known hot CVD treatment or similar treatment in a hydrocarbon compound gas and/or vapor under atmospheric pressure or reduced pressure and at a temperature of 600 to 1,200° C., preferably 800 to 1,100° C. The treatment forms a carbon film on particle surfaces, and may form a silicon carbide layer at the silicon-carbon layer interface at the same time. The treatment time may be determined as appropriate depending on the desired coating weight of carbon, treatment temperature, the concentration (or flow velocity) and quantity of organic gas, and the like. Usually a treatment time of 1 to 10 hours, especially 2 to 7 hours is employed for efficiency and economy.

The hydrocarbon compound used herein is selected from those compounds capable of producing carbon through pyrolysis at the heat treatment temperature, for example, hydrocarbons such as methane, ethane, ethylene, acetylene, propane, butane, isobutane, butene, pentane, hexane, etc., alone or in admixture, mono- to tri-cyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or in admixture. Also, gas light oil, creosote oil and anthracene oil obtained from the tar distillation step are useful as well as naphtha cracked tar oil, alone or in admixture.

Negative Electrode Material

One embodiment of the invention is a negative electrode material for non-aqueous electrolyte secondary batteries, comprising the aforementioned Si—O—Al composite as an active material and preferably further comprising a binder.

Binder

When a binder is used in the negative electrode material, it is preferably selected from polyimide resins, especially aromatic polyimide resins. The polyimide resin binder has improved bond to the current collector and ensures fabrication of a non-aqueous electrolyte secondary battery which has a high initial charge/discharge efficiency, small volumetric changes associated with charge/discharge cycles, improved performance and efficiency over repeated charge/discharge cycles. The aromatic polyimide resin binder has good solvent resistance and is effective for preventing peeling of the negative electrode from the current collector and separation of the active material. Note that the binder may be used alone or in admixture of two or more.

The aromatic polyimide resins are generally difficultly soluble in organic solvents and must not be swollen or dissolved in electrolytic solution. In general, aromatic polyimide resins are soluble only in high-boiling organic solvents, for example, cresol. Thus an electrode paste may be prepared by adding a polyamic acid, polyimide precursor which is relatively easily soluble in many organic solvents such as dimethylformamide, dimethylacetamide, N-methylpyrrolidone, ethyl acetate, acetone, methyl ethyl ketone, methyl isobutyl ketone, and dioxolan, and heat treating at a temperature of at least 300° C. for a long time for thereby effecting dehydration and imidization, thus forming a polyimide binder.

Suitable aromatic polyimide resins are those having a basic skeleton derived from tetracarboxylic dianhydrides and diamines. Suitable tetracarboxylic dianhydrides include aromatic tetracarboxylic dianhydrides such as pyromellitic danhydride, benzophenonetetracarboxylic dianhydride and biphenyltetracarboxylic dianhydride, alicyclic tetracarboxylic dianhydrides such as cyclobutanetetracarboxylic dianhydride, cyclopentanetetracarboxylic dianhydride and cyclohexanetetracarboxylic dianhydride, and aliphatic tetracarboxylic dianhydrides such as butanetetracarboxylic dianhydride, alone or in admixture.

Suitable diamines include aromatic, alicyclic and aliphatic diamines such as, for example, p-phenylene diamine, m-phenylene diamine, 4,4'-diaminodiphenylmethane, 4,4'-diaminodiphenyl ether, 2,2'-diaminodiphenylpropane, 4,4'-diaminodiphenyl sulfone, 4,4'-diaminobenzophenone, 2,3-diaminonaphthalene, 1,3-bis(4-aminophenoxy)benzene, 1,4-bis(4-aminophenoxy)benzene, 4,4'-di(4-aminophenoxy) diphenyl sulfone, 2,2'-bis[4-(4-aminophenoxy)phenyl] propane, alone or in admixture.

Synthesis of polyamic acid intermediate is generally carried out by a solution polymerization process. The process uses a solvent such as N,N'-dimethylformamide, N,N'-dimethylacetamide, N-methyl-2-pyrrolidone, N-methylcaprolactam, dimethyl sulfoxide, tetramethyl urea, pyridine, dimethyl sulfone, hexamethylphosphoramide, and butyrolactone, alone or in admixture.

The reaction temperature is generally in the range of −20° C. to 150° C., and preferably −5° C. to 100° C. The polyamic acid intermediate is converted into a polyimide resin typically by heating to induce dehydration and cyclization. Heating for dehydration and cyclization may be at any temperature in the range of 140 to 400° C. and preferably 15° to 250° C. The time taken for dehydration and cyclization is 30 seconds to 10 hours, and preferably 5 minutes to 5 hours, depending on the heating temperature.

As the polyimide resin, polyimide resins in powder form and solutions of polyimide precursors in N-methylpyrrolidone are commercially available. Examples include U-Varnish A, U-Varnish S, UIP-R and UIP-S from Ube Industries Ltd., Kayaflex KPI-121 from Nippon Kayaku Co., Ltd., and Rikacoat SN-20, PN-20 and EN-20 from New Japan Chemical Co., Ltd.

The binder is preferably present in an amount of 1 to 20%, and more preferably 3 to 15% by weight based on the negative electrode material. Less amounts of the binder may allow the active material to separate apart whereas excessive amounts may reduce the percent voids and increase a dielectric fraction to interfere with migration of lithium ions.

When a negative electrode material is prepared using the active material, a conductive agent such as graphite may be added. The type of conductive agent used herein is not particularly limited as long as it is an electronically conductive material which will not be decomposed or altered in the battery. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins. Acetylene black is typical. The conductive agent is preferably used in solvent dispersion form because an electrode paste in which the conductive agent is uniformly distributed and bonded to Si—O—Al composite particles is obtained by previously dispersing the conductive agent in a solvent such as water or N-methylpyrrolidone and adding the dispersion to the active material. Any well-known surfactant may be added to help disperse the conductive agent in the solvent. The solvent used for conductive agent dispersion is desirably the same as the solvent used for the binder.

The conductive agent is present in an amount of up to 50% by weight based on the negative electrode material (corresponding to a battery capacity of at least about 1,000 mAh/g of the negative electrode material). The amount of conductive agent is preferably 1 to 30%, and more preferably 1 to 10% by weight based on the negative electrode material. If the amount of the conductive agent is too small, the negative electrode material may have a poor conductivity, tending to exhibit a higher initial resistivity. An excessive amount of the conductive agent may lead to a drop of battery capacity.

Besides the polyimide resin binder, carboxymethyl cellulose, sodium polyacrylate, acrylic polymers or fatty acid esters may be added as a viscosity regulator to the negative electrode material.

Negative Electrode

From the negative electrode material, a negative electrode may be prepared, for example, by the following procedure. The negative electrode (shaped form) is prepared by combining the Si—O—Al composite or active material with an optional binder, conductive agent, and additives, kneading them in a solvent suitable for dissolution and dispersion of the binder such as water or N-methylpyrrolidone to form a paste-like mix, and applying the mix in sheet form to a current collector. The current collector used herein may be a foil of any material which is commonly used as the negative electrode current collector, for example, a copper or nickel foil while the thickness and surface treatment thereof are not particularly limited. The method of shaping or molding the mix into a sheet is not limited, and any well-known method may be used.

Preferably the negative electrode comprising the negative electrode material experiences a volumetric change by a factor of not more than 2 before and after charging, more preferably a volumetric change by a factor of 1.0 to 1.8, and even more preferably 1.0 to 1.6. A negative electrode experiencing such a small volumetric change before and after charging is provided by the negative electrode material of the invention. More specifically, provided that the negative electrode has a volume V1 prior to charging and a volume V2 after charging, V2 is greater than V1 by a factor of not more than 2 (i.e., $V2/V1 \leq 2$). Note that a volumetric change before and after charging is measured according to the procedure "Determination of Battery Properties" in Example to be described later.

The negative electrode material comprising the Si—O—Al composite as an active material according to the invention has a high capacity as compared with the currently available graphite and other materials, exhibits a high initial efficiency as compared with silicon oxide alone, and offers a small controlled volume change associated with charge/discharge cycles and good adhesion between particles and the binder. Using the negative electrode material, a non-aqueous electrolyte secondary battery, especially lithium ion secondary battery, having improved cycle performance may be fabricated.

Non-Aqueous Electrolyte Secondary Battery

A non-aqueous electrolyte secondary battery may be fabricated from the negative electrode (shaped form) thus obtained. A typical secondary battery is a lithium ion secondary battery. A further embodiment of the present invention is a secondary battery comprising a positive electrode, a negative electrode, a separator, and a non-aqueous electrolyte, characterized in that the negative electrode comprises the negative electrode material defined herein, that is, the negative electrode (shaped form) constructed as above. The other components including positive electrode, separator, and non-aqueous electrolytic solution, and the battery shape are not particularly limited.

The positive electrode active materials include oxides and sulfides which are capable of occluding and releasing lithium ions. They may be used alone or in admixture. Examples include sulfides and oxides of metals excluding lithium such as $TiS_2$, $MoS_2$, $NbS_2$, $ZrS_2$, $VS_2$, $V_2O_5$, $MoO_3$, $Mg(V_3O_8)_2$, and lithium and lithium-containing complex oxides. Composite metals such as $NbSe_2$ are also useful. For increasing the energy density, lithium complex oxides based on $Li_pMetO_2$ are preferred wherein Met is preferably at least one element of cobalt, nickel, iron and manganese and p usually has a value in the range: $0.05 \leq p \leq 1.10$. Illustrative examples of the lithium complex oxides include $LiCoO_2$, $LiNiO_2$, $LiFeO_2$, and $Li_qNi_rCo_{1-r}O_2$ (wherein q and r have values varying with the charged/discharged state of the battery and usually in the range: $0<q<1$ and $0.7<r\leq1$) having a layer structure, $LiMn_2O_4$ having a spinel structure, and rhombic $LiMnO_2$. Also used is a substitutional spinel type manganese compound adapted for high voltage operation which is $LiMet_sMn_{1-s}O_4$ wherein Met is titanium, chromium, iron, cobalt, nickel, copper, zinc or the like and s has a value in the range: $0<s<1$.

It is noted that the lithium complex oxide described above is prepared, for example, by grinding and mixing a carbonate, nitrate, oxide or hydroxide of lithium and a carbonate, nitrate, oxide or hydroxide of a transition metal in accordance with the desired composition, and firing at a temperature in the range of 600 to 1,000° C. in an oxygen atmosphere.

Organic materials may also be used as the positive electrode active material. Examples include polyacetylene, polypyrrole, poly-p-phenylene, polyaniline, polythiophene, polyacene, and polysulfide.

From the positive electrode active material, a positive electrode (shaped form) may be prepared by a well-known method, specifically by mixing the active material with a conductive agent and a binder (as used in the negative electrode mix) and applying the mix to a current collector.

The separator disposed between the positive and negative electrodes is not particularly limited as long as it is stable to the electrolytic solution and holds the solution effectively. The separator is most often a porous sheet or non-woven fabric of polyolefins such as polyethylene, polypropylene and copolymers thereof and aramide resins. Such sheets may be used as a single layer or a laminate of multiple layers. Ceramics such as metal oxides may be deposited on the surface of sheets. Porous glass and ceramics are employed as well.

The non-aqueous electrolyte used herein may be a non-aqueous electrolyte solution containing an electrolyte salt and a non-aqueous solvent. Exemplary of the electrolyte salt used herein are light metal salts. Examples of the light metal salts include salts of alkali metals such as lithium, sodium and potassium, salts of alkaline earth metals such as magnesium and calcium, and aluminum salts. A choice may be made among these salts and mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, which may be used alone or in admixture.

From the electric conductivity aspect, the electrolyte salt is preferably present in a concentration of 0.5 to 2.0 mole/liter of the non-aqueous electrolytic solution. The electrolyte should preferably have a conductivity of at least 0.01 S/cm at a temperature of 25° C., which may be adjusted in terms of the type and concentration of the electrolyte salt.

If desired, various additives may be added to the non-aqueous electrolytic solution. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid anhydrides, nitrogen- and sulfur-containing compounds for acid removal and water removal purposes.

Suitable non-aqueous solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methylsulfolane, acetonitrile, propionitrile, anisole, acetic acid esters, e.g., methyl acetate and propionic acid esters. It is desirable to use a mixture of an aprotic high-dielectric-constant solvent and an aprotic low-viscosity solvent in a proper ratio. It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing non-aqueous solvent.

Also a solid electrolyte or gel electrolyte may be used as the non-aqueous electrolyte. For example, a silicone gel, silicone polyether gel, acrylic gel, silicone acrylic gel, acrylonitrile gel, poly(vinylidene fluoride) or the like may be included in a polymer form. These ingredients may be polymerized prior to or after casting. They may be used alone or in admixture.

The secondary battery may take any desired shape. In general, the battery is of the coin type wherein electrodes and a separator, all punched into coin shape, are stacked, or of the rectangular or cylinder type wherein electrode sheets and a separator are spirally wound.

EXAMPLE

Examples are given below for further illustrating the invention, but they are not to be construed as limiting the invention thereto. In Examples, the particle size is a median diameter $D_{50}$ as determined by a particle size distribution instrument SALD-7000 (Shimadzu Mfg. Co., Ltd.) utilizing laser light diffractometry, unless otherwise stated.

Preparation of Silicon Oxide Powder

A mixture of equimolar amounts of silicon dioxide powder (BET specific surface area=200 m²/g) and chemical grade metallic silicon powder (BET specific surface area=4 m²/g) was heat treated in a hot vacuum atmosphere at 1,350° C. and 100 Pa to produce silicon oxide gas, which precipitated on a stainless steel substrate held at 900° C. The precipitate was collected and crushed by a jaw crusher. The crushed material was ground in a jet mill AFG-100 (Hosokawa Micron Group) with the built-in classifier operating at 9,000 rpm. From a downstream cyclone, a fraction of dark brown colored silicon oxide powder (SiOx: x=1.02) having $D_{50}$=7.6 μm and $D_{90}$=11.9 μm was recovered.

Preparation of Active Material Powders #1 to #3

Mixtures were prepared by combining the silicon oxide powder prepared above with an aluminum powder (average particle size $D_{50}$=30 μm) in a weight ratio (silicon oxide/aluminum) of 95/5, 92.5/7.5, and 90/10. In a horizontal controlled-atmosphere furnace, each mixture was treated in an argon stream at 800° C. for 3 hours. At the end of operation, the furnace was allowed to cool, whereupon a blackish brown colored powder was collected. The powder thus collected from any of the mixtures contained few agglomerates and had an average particle size of 7.6 μm. They are designated active material powders #1 to #3. On elemental analysis, they had an aluminum content of 5%, 7.5%, and 10% by weight, respectively. Active material powders #1 to #3 were analyzed by powder XRD to see if aluminum had been fully reacted. Peaks corresponding to aluminum disappeared and an increase of new crystalline silicon was confirmed. For the three samples, a signal near 21° had an intensity of 293, 252, and 245 cps, and a signal of silicon at 28.3° had an intensity of 539, 782 and 1136 cps. The 28.3° signal intensity was 1.8, 3.1, and 4.6 times the near 21° signal intensity.

It is noted that for powder XRD analysis, a powder X-ray diffractometer with a rotating anticathode (M18XHF-SRA, Mac Science Co., Ltd.) was operated with CuKα radiation, by 2θ/θ continuous scanning at a tube voltage of 30 kV and a tube current of 40 mA.

Preparation of Active Material Powder #4

A rotary kiln reactor was charged with active material powder #2 where hot CVD treatment was carried out in a stream of a methane-argon gas mixture at 1,000° C. for an average residence time of about 2 hours. At the end of operation, the furnace was allowed to cool, whereupon a black colored powder was collected. The black powder had a carbon coating weight of 5.1 wt % based on the carbon-coated active material and an average particle size of 8.1 μm. On elemental analysis, provided that carbon is excluded, the powder had a silicon content of 59.6 wt %, an oxygen content of 32.9 wt %, and an aluminum content of 7.5 wt %, indicating that the aluminum content remained unchanged even after carbon deposition. On powder XRD analysis, peaks corresponding to aluminum disappeared and an increase of new crystalline silicon was confirmed. A signal near 21° had an intensity of 251 cps, and a signal of silicon at 28.3° had an intensity of 884 cps. The 28.3° signal intensity was 3.5 times the near 21° signal intensity. The XRD pattern is shown in FIG. 2.

Preparation of Active Material Powder #5

An active material powder was prepared by the same procedure as active material powder #2 except that the reaction with aluminum was effected at a temperature of 1,000° C. A rotary kiln reactor was charged with this active material powder where hot CVD treatment was carried out in a stream of a methane-argon gas mixture at 1,000° C. for an average residence time of about 2 hours. At the end of operation, the furnace was allowed to cool, whereupon a black colored powder was collected. The black powder had a carbon coating weight of 5.0 wt % based on the carbon-coated active material and an average particle size of 8.0 μm. On elemental analysis, provided that carbon is excluded, the powder had a silicon content of 59.6 wt %, an oxygen content of 32.9 wt %, and an aluminum content of 7.5 wt %. On powder XRD analysis, peaks corresponding to aluminum disappeared and an increase of new crystalline silicon was confirmed. A signal near 21° had an intensity of 238 cps, and a signal of silicon at 28.3° had an intensity of 1,916 cps. The 28.3° signal intensity was 8.1 times the near 21° signal intensity. The XRD pattern is shown in FIG. 3.

Figure 2:
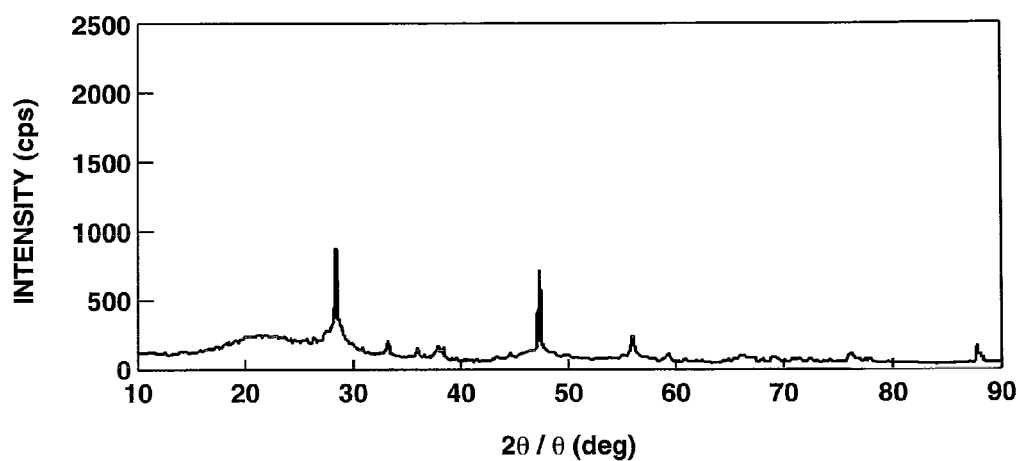
FIG. 2 is a powder XRD spectrum of active material powder #4.
Figure 3:
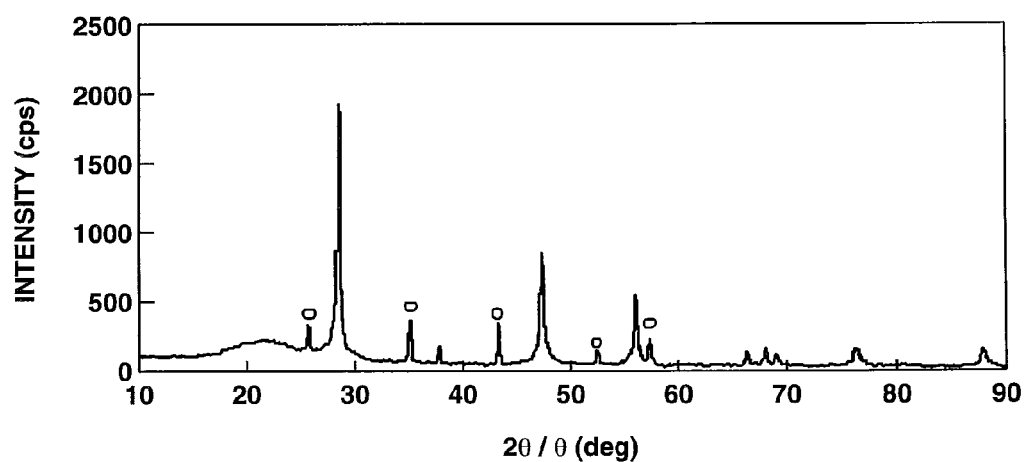
FIG. 3 is a powder XRD spectrum of active material powder #5. It is noted that peaks with circles atop are signals of corundum aluminum oxide (α-alumina).

FIGS. 1 to 3 show powder XRD spectra of the silicon oxide/aluminum powder mixture prior to heating used in the preparation of active material powder #2, of active material powder #4, and of active material powder #5, respectively. It is seen that in active material powders #4 and #5, signals of aluminum substantially extinguished as a result of reaction. In active material powder #5 resulting from reaction at higher temperature, the signal of silicon at 28.3° had an increased intensity, indicating the growth of crystalline silicon. In active material powder #5, signals assigned to corundum aluminum oxide (α-alumina) were observed near 25.4°, 35.0°, 37.6°, 43.2°, 52.4°, and 57.4°. In active material powder #4, only vague signals were observed, indicating that aluminum oxide is not corundum.

Preparation of Comparative Active Material Powder #1C

The silicon oxide powder prior to mixing and reaction with aluminum powder is comparative active material powder #1C.

Preparation of comparative Active Material Powder #2C

A rotary kiln reactor was charged with comparative active material powder #1C where hot CVD treatment was carried out in a stream of a methane-argon gas mixture at 1,000° C. for an average residence time of about 2 hours. At the end of operation, the furnace was allowed to cool, whereupon a black colored powder was collected. The black powder had a carbon coating weight of 5.2 wt % based on the carbon-coated active material and an average particle size of 8.0 μm. On powder XRD analysis, a signal near 21° had an intensity of 315 cps, and a signal of silicon at 28.3° had an intensity of 620 cps. The 28.3° signal intensity was 2.0 times the near 21° signal intensity.

Preparation of Comparative Active Material Powder #3C

An active material powder was prepared by the same procedure as active material powder #2 except that the reaction with aluminum was effected at a temperature of 1,200° C. The reaction product was a dark brown colored coagulated lump which had to be ground. A rotary kiln reactor was charged with this active material powder where hot CVD treatment was carried out in a stream of a methane-argon gas mixture at 1,000° C. for an average residence time of about 2 hours. At the end of operation, the furnace was allowed to cool, whereupon a black colored powder was collected. The black powder had a carbon coating weight of 5.1 wt % based on the carbon-coated active material and an average particle size of 7.9 μm. On elemental analysis, provided that carbon is excluded, the powder had a silicon content of 58 wt %, an oxygen content of 32 wt %, and an aluminum content of 10 wt %. On powder XRD analysis, a signal near 21° had an intensity of 230 cps, and a signal of silicon at 28.3° had an intensity of 2,132 cps. The 28.3° signal intensity was 9.3 times the near 21° signal intensity.

Examples 1 to 5 and Comparative Example 1 to 3

The active material powder, optionally in admixture with a dispersion of acetylene black as a conductive agent in N-methylpyrrolidone (solids 17.5 wt %), was diluted with N-methylpyrrolidone. A polyimide resin (U-Varnish A by Ube Industries Ltd., solids 18.1 wt %) as a binder was added thereto to form a slurry. The slurry was coated onto a copper foil of 12 μm thick by means of a doctor blade having a gap of 50 μm, vacuum dried at 200° C. for 2 hours, and pressed by a roller press at 60° C. into a negative electrode shaped form. Finally, pieces of 2 cm² were punched out of the shaped form and used as a negative electrode. The composition of solid components is shown in Table 1.

Determination of Battery Properties

To evaluate the negative electrode material, six lithium ion secondary cells were fabricated using the shaped form as the negative electrode and a lithium foil as the positive electrode. The electrolytic solution was a non-aqueous electrolyte solution of lithium bis(trifluoromethanesulfonyl)imide in a 1/1 (by volume) mixture of ethylene carbonate and diethyl carbonate in a concentration of 1 mol/liter. The separator was a microporous polyethylene film of 30 μm thick.

The test cells were aged overnight at room temperature. Two of the test cells were disassembled immediately after aging, and thickness measurement was performed, that is, the thickness in the state swollen with electrolytic solution was measured, from which an initial volume V1 was calculated. Note that an increment of lithium resulting from the electrolytic solution and charging was neglected. Next two of the test cells were tested by means of a secondary cell charge/discharge tester (Nagano K.K.). Charging was conducted with a constant current flow of 0.05 c until the voltage of the test cell reached 5 mV, and after reaching 5 mV, continued with a reduced current flow so that the cell voltage was kept at 5 mV, and terminated when the current flow decreased below 0.02 c. Note that "c" designates a current value with which the theoretical capacity of a negative electrode is charged in 1 hour, i.e., 1 c=15 mA. At the end of the charging test, the test cells were disassembled, and thickness measurement was performed, from which a charged volume V2 was calculated. From V1 and V2, a volumetric change factor upon charging was calculated as V2/V1. For the remaining two test cells, the same charging test was carried out, after which the cell was discharged with a constant current flow of 0.05 c until the cell voltage reached 1,500 mV. A charge/discharge capacity was determined, from which a 1st cycle charge/discharge efficiency (%) was computed. The charge/discharge capacity is a capacity per active material excluding the binder. The 1st cycle charge/discharge efficiency is a percentage of discharge capacity relative to charge capacity. The test results are also shown in Table 1.

TABLE 1

| Composition (wt %) | | Example | | | | | Comparative Example | | |
|---|---|---|---|---|---|---|---|---|---|
| | | 1 | 2 | 3 | 4 | 5 | 1 | 2 | 3 |
| Active material powder | #1 | 85 | | | | | | | |
| | #2 | | 85 | | | | | | |
| | #3 | | | 85 | | | | | |
| | #4 | | | | 90 | | | | |
| | #5 | | | | | 90 | | | |
| Comparative active material powder | #1C | | | | | | | | |
| | #2C | | | | | | | | |
| | #3C | | | | | | | | |
| Conductive agent | | 5 | 5 | 5 | | | 5 | | |
| Binder | | 10 | 10 | 10 | 10 | 10 | 10 | 10 | 10 |
| Total | | 100 | 100 | 100 | 100 | 100 | 100 | 100 | 100 |
| Volumetric change factor (V2/V1) | | 1.33 | 1.39 | 1.42 | 1.47 | 1.56 | 1.41 | 1.60 | 1.14 |
| Charge capacity (mAh/g) | | 1941 | 1875 | 1820 | 1874 | 1673 | 1908 | 1941 | 418 |
| 1st cycle charge/discharge efficiency (%) | | 73.2 | 74.9 | 76.5 | 75.8 | 75.7 | 71.0 | 71.2 | 53.5 |

As is evident from Table 1, Examples 1 to 3 have a high 1st cycle charge/discharge efficiency as compared with Comparative Example 1 using silicon oxide as active material. Example 4 involving carbon deposition treatment has a higher 1st cycle charge/discharge efficiency, with better data even when compared with Comparative Example 2. Example 5 in which the reaction temperature is set higher and the 28.3° signal intensity is 8.1 times the near 21° signal intensity shows a propensity for somewhat reducing the charge capacity, whereas Comparative Example 3 in which the reaction temperature is set even higher and the 28.3° signal intensity is 9.3 times the near 21° signal intensity has a charge capacity which is reduced to ⅓ of Example 5. The use of the negative electrode active material of the invention achieves improvements in 1st cycle charge/discharge efficiency which was detrimental to practical use while maintaining the volume expansion at an acceptable level.

Determination of Cycle Performance

Negative electrode shaped forms were prepared from the active material powders of Example 4 and Comparative Example 2 by the same procedure as described above. To evaluate the cycle performance of the negative electrode shaped forms, a coin-type lithium ion secondary cell was fabricated. The positive electrode was a single layer sheet using $LiCoO_2$ as the active material and an aluminum foil as the current collector (trade name Pioxcel C-100 by Pionics Co., Ltd.). The non-aqueous electrolyte was a non-aqueous electrolyte solution of lithium hexafluorophosphate in a 1/1 (by volume) mixture of ethylene carbonate and diethyl carbonate in a concentration of 1 mol/liter. The separator was a microporous polyethylene film of 30 µm thick.

The cell was aged two nights at room temperature before it was tested by means of a secondary cell charge/discharge tester (Nagano K.K.). Charging was conducted with a constant current flow of 1.2 mA (0.25 c vs. positive electrode) until the voltage of the test cell reached 4.2 V, and after reaching 4.2 V, continued with a reduced current flow so that the cell voltage was kept at 4.2 V, and terminated when the current flow decreased below 0.3 mA. Discharging was conducted with a constant current flow of 0.6 mA and terminated when the cell voltage reached 2.5 V. A discharge capacity was determined. The charging/discharging operation was repeated 200 cycles. The discharge capacity at the 200th cycle divided by the discharge capacity at the 10th cycle is reported as a percent discharge capacity retentivity in Table 2. As compared with Comparative Example 2, Example 4 displayed substantially equivalent cycle performance, despite a high discharge capacity, due to increased 1st cycle charge/discharge efficiency.

TABLE 2

| | Discharge capacity retentivity after 200 cycles, % |
|---|---|
| Example 4 | 95 |
| Comparative Example 2 | 91 |

Japanese Patent Application No. 2008-216368 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A negative electrode material for non-aqueous electrolyte secondary batteries, comprising:
    as an active material, a Si—O—Al composite consisting of silicon in a form of silicon crystallites, silicon oxide in a form of $SiO_x$, wherein $0 < x \le 2$, and aluminum oxide in a form of aluminum trioxide $Al_2O_3$; and
    a binder, wherein
    said Si—O—Al composite exhibits on powder X-ray diffractometry a spectrum including a signal(s) in a range of 15° to 25° and a signal assigned to silicon at 28.3°, and an intensity of the signal at 28.3° is 1 to 9 times a maximum intensity of the signal(s) in the range of 15° to 25°,
    said Si—O—Al composite has a structure that the silicon crystallites of the silicon are dispersed in said Si—O—Al composite,
    said Si—O—Al composite exhibits on solid NMR ($^{29}$Si-DDMAS) analysis a spectrum including a broad peak assigned in silicon dioxide centering near–110 ppm and a peak characteristics of diamond crystal of silicon near–84 ppm, and
    said binder is a polyimide resin.

2. The negative electrode material of claim 1, wherein said Si—O—Al composite is obtained by reacting silicon oxide with aluminum.

3. The negative electrode material of claim 1, wherein the spectrum of said Si—O—Al composite by powder X-ray diffractometry includes no signals assigned to corundum aluminum oxide.

4. The negative electrode material of claim 1, further comprising a carbon coating on a surface of the Si—O—Al composite.

5. The negative electrode material of claim 1, wherein an amount of the binder is 1 to 20% by weight based on the negative electrode material.

6. The negative electrode material of claim 1, wherein the intensity of the signal at 28.3° is 1 to 5 times the intensity of a signal at 21°.

7. The negative electrode material of claim 1, wherein the intensity of the signal at 28.3° is 1.8 to 8.1 times the intensity of a signal at 21°.

8. The negative electrode material of claim 1, wherein the intensity of the signal at 28.3° is at least 539 cps.

9. The negative electrode material of claim 1, wherein said Si—O—Al composite contains 45 to 63% by weight of silicon, 26 to 36% by weight of oxygen, and 1 to 29% by weight of aluminum.

10. The negative electrode material of claim 1, wherein said Si—O—Al composite contains 57 to 63% by weight of silicon and 1 to 10% by weight of aluminum.

11. A negative electrode for non-aqueous electrolyte secondary batteries, comprising the negative electrode material of claim 1.

12. The negative electrode of claim 11 which has volumes before and after charging, the volume after charging being up to 2 times the volume before charging.

13. A non-aqueous electrolyte secondary battery comprising the negative electrode of claim 11, a positive electrode, a separator, and a non-aqueous electrolyte.

14. The non-aqueous electrolyte secondary battery of claim 13 which is a lithium ion secondary battery.

* * * * *